(12) United States Patent
Waugh

(10) Patent No.: US 10,061,728 B2
(45) Date of Patent: Aug. 28, 2018

(54) ARBITRATION AND HAZARD DETECTION FOR A DATA PROCESSING APPARATUS

(71) Applicant: ARM LIMITED, Cambridge (GB)

(72) Inventor: Alex James Waugh, Cambridge (GB)

(73) Assignee: ARM Limited, Cambridge (GB)

( * ) Notice: Subject to any disclaimer, the term of this patent is extended or adjusted under 35 U.S.C. 154(b) by 535 days.

(21) Appl. No.: 14/801,990

(22) Filed: Jul. 17, 2015

(65) Prior Publication Data
US 2016/0048469 A1   Feb. 18, 2016

(30) Foreign Application Priority Data

Aug. 12, 2014 (GB) .................................. 1414266.5

(51) Int. Cl.
  G06F 13/40    (2006.01)
  G06F 9/445    (2018.01)
  G06F 13/364   (2006.01)
  G06F 13/42    (2006.01)

(52) U.S. Cl.
  CPC ........ *G06F 13/364* (2013.01); *G06F 13/4031* (2013.01); *G06F 13/4282* (2013.01)

(58) Field of Classification Search
  None
  See application file for complete search history.

(56) References Cited

U.S. PATENT DOCUMENTS

| | | | |
|---|---|---|---|
| 4,785,394 A | 11/1988 | Fischer | |
| 6,138,218 A | 10/2000 | Arimilli et al. | |
| 6,704,822 B1 | 3/2004 | Tremblay et al. | |
| 8,443,030 B1 | 5/2013 | Tang | |
| 2006/0184746 A1 | 8/2006 | Guthrie et al. | |
| 2006/0282829 A1 | 12/2006 | McIlvaine et al. | |
| 2007/0088886 A1 | 4/2007 | Conner | |
| 2007/0300040 A1 | 12/2007 | Meaney et al. | |
| 2008/0071990 A1 | 3/2008 | Walters et al. | |
| 2010/0332804 A1 | 12/2010 | Golla et al. | |
| 2012/0047353 A1 | 2/2012 | Gupta et al. | |
| 2012/0317322 A1 | 12/2012 | Chirca et al. | |
| 2013/0339619 A1 | 12/2013 | Roy | |

FOREIGN PATENT DOCUMENTS

JP   02-178754   7/1990

OTHER PUBLICATIONS

GB Search Report dated Feb. 12, 2015 in GB 1414266.5, 3 pages.

*Primary Examiner* — Idriss N Alrobaye
*Assistant Examiner* — Dayton Lewis-Taylor
(74) *Attorney, Agent, or Firm* — Nixon & Vanderhye P.C.

(57) ABSTRACT

A device for selecting requests to be serviced in a data processing apparatus has an arbitration stage for selecting an arbitrated request from a plurality of candidate requests and a hazard detection stage for performing hazard detection to predict whether the arbitrated request selected by the arbitration stage meets a hazard condition. If the arbitrated request meets the hazard condition, the hazard detection stage returns the arbitration request to the arbitration stage for a later arbitration and sets a hazard indication for the returned request. Also, the hazard detection stage controls at least one other arbitration request to be returned if it conflicts with a candidate request having the hazard indication set. This approach prevents denial of service to requests that were hazarded.

23 Claims, 4 Drawing Sheets

ARBITRATION AND HAZARD DETECTION FOR A DATA PROCESSING APPARATUS

This application claims priority to GB Patent Application No. 1414266.5 filed 12 Aug. 2014, the entire content of which is hereby incorporated by reference.

BACKGROUND

Technical Field

The present technique relates to the field of data processing. More particularly it relates to selecting requests to be serviced in a data processing apparatus.

Technical Background

A data processing apparatus may have resources which can be requested by one or more devices within the apparatus. For example, the requested resource may be the use of a particular hardware unit for a processing operation, or access to data from a given memory address. There may be a limited number of requests that can be processed simultaneously and so arbitration may select which of several candidate requests is serviced. On the other hand, hazard detection may also be performed to check whether servicing a particular request would cause a hazard condition, which could lead to incorrect processing for example. Hence, a device for selecting requests to be serviced within a data processing apparatus may perform both arbitration and hazard detection. The present technique seeks to provide an improved technique for combining arbitration with hazard detection.

SUMMARY

An example aspect provides a device for selecting requests to be serviced in a data processing apparatus, the device comprising:

an arbitration stage configured to perform arbitration to select an arbitrated request from among a plurality of candidate requests received by the device; and a hazard detection stage configured to perform hazard detection to detect whether the arbitrated request selected by the arbitration stage meets a hazard condition;

wherein if the hazard detection stage detects that the arbitrated request selected by the arbitration stage meets the hazard condition, then the hazard detection stage is configured to control the arbitrated request to be returned to the arbitration stage as a candidate request for a later arbitration and to set a hazard indication for the returned candidate request; and the hazard detection stage is configured to control at least one other arbitrated request to be returned to the arbitration stage as a candidate request for a later arbitration if it conflicts with a candidate request having the hazard indication set.

The device may be any device within a data processing apparatus which selects which requests should be serviced (for example control logic in an interconnect, a memory controller, or coherency or snoop control logic). The device has an arbitration stage for performing arbitration to select an arbitrated request from among a number of candidate requests received by the device, and a hazard detection stage which performs hazard detection to detect whether the arbitrated request selected by the arbitration stage meets a hazard condition. If the hazard detection stage detects that the arbitrated request meets the hazard condition then the arbitrated request is returned to the arbitration stage to be a candidate again for a later arbitration. This prevents a request for which a hazard would arise being serviced. Arbitration for the returned candidate request can be retried later, so that when the hazard is resolved, the request can be serviced.

By performing the arbitration before the hazard detection, the circuit scale of the device can be reduced because it is not necessary to compare all the candidate requests to determine whether they meet the hazard condition. Instead, it is sufficient for the hazard detection to consider just the arbitrated request which won the arbitration at the arbitration stage. However, with this approach there is a risk that, by the time the hazard which caused an arbitrated request to be returned to the arbitration stage is resolved, another candidate request may already have been selected for servicing, and if this candidate request itself would cause a hazard with the arbitrated request which was returned, the returned request may be rejected again even if it is selected by the arbitration stage. If this keeps happening, then the same request may continually be hazarded each time it reaches the hazard detection stage. If a particular request continues to be rejected and other requests are systematically prioritized, this can lead to unfairness, starvation, or denial of service, which can significantly reduce processing performance.

To address this problem, the hazard detection stage may set a hazard indication for a request which, when selected as the arbitrated request that won the arbitration at the arbitration stage, is detected as meeting the hazard condition, and returned for a later arbitration. The hazard detection stage may set the hazard indication either directly by setting a control value to indicate that the hazard indication is set, or indirectly by sending a signal to another part of the system (e.g. the arbitration stage or processing logic outside the device for selecting requests) to trigger that part of the system to set the hazard indication.

Also, if the hazard detection stage encounters another arbitrated request which conflicts with another candidate request which has the hazard indication set, then the hazard detection stage may control the other arbitrated request to be returned to the arbitration stage as a candidate request for a later arbitration. That is, even if the arbitrated request does not itself trigger the hazard condition, if it conflicts with a candidate request which has the hazard indication set, then it is effectively treated as hazarding and returned to the arbitration stage. In this way, a request which has already won arbitration at the arbitration stage, but which was hazarded, is treated more favourably since other requests which would conflict with it are rejected from the hazard detection stage until the already-hazarded request returns to the hazard detection stage. This ensures that having won arbitration at the arbitration stage, a hazarded request retains its opportunity to be serviced despite the detection of the hazard, and so this avoids a hazarded request being systematically rejected when other conflicting requests jump ahead of it. By avoiding denial of service to particular requests, processing performance can be improved in the data processing apparatus that uses the device. Also, this approach requires relatively little circuit overhead to provide this performance improvement.

Note that there may be other situations in which a request is returned from the hazard detection stage, other than when a hazard is detected or a non-hazarded request conflicts with a request for which a hazard indication is set. This is not an exclusive list of the situations in which requests may be rejected by the hazard detection stage.

In some cases, the other arbitrated request rejected by the hazard detection stage when it conflicts with a request having the hazard indication site may be a request which has the hazard indication in a state other than the state in which the hazard indication is set (e.g. a state in which the hazard indication is not set). This can ensure that, if multiple conflicting requests have the hazard indication set, they are not all rejected because of the conflict with another request having the hazard indication set, to prevent a deadlock arising.

In other examples, it is not essential to consider whether the other arbitrated request has the hazard indication set. For example, as discussed below, some example embodiments may set the hazard indication for one request and then prevent the hazard indication being set for any conflicting requests even if they are hazarded and rejected by the hazard detection stage. In this case, there is no risk of a deadlock since it is not possible for multiple conflicting requests to have the hazard indication set, and so the hazard detection stage may simply detect whether the other arbitrated request conflicts with a candidate request having the hazard indication set, without considering the state of the hazard indication for that other arbitrated request.

In each arbitration, the arbitration stage may select at least two candidate requests from the requests it has received and then arbitrate between the selected at least two requests to select the arbitrated request. When returning the other arbitrated request to the arbitration stage because it conflicts with a candidate request having the hazard indication set, the candidate request need not be one of the at least two candidate request which is currently selected for arbitration. Hence, even if a candidate request which has been returned from the arbitration stage has not yet been considered by the arbitration stage for a particular arbitration, the hazard indication tracks that request to make sure that other conflicting requests are not favoured over the returned candidate request. Since it is not essential to ensure that the returned candidate request is presented for arbitration in the same cycle as other conflicting requests, this improves performance since there is no need to unnecessarily delay presentation of certain requests to the arbiter.

In some examples, the arbitration stage may select the arbitrated request from a single queue of requests.

However, the present technique is particularly useful where here are several types of requests, and the arbitration comprises selecting which of the types of candidate requests should be serviced next. For example, the types of request may be different kinds of requests, or each type of request may correspond to a different initiator device which initiated the requests. Where there are several types of requests, it can sometimes be important to ensure that the arbitration stage is fair to each type of request. Therefore, in some embodiments the arbitration stage may use an arbitration policy which provides an equal probability of selecting each type of request (for example a round robin policy). Other embodiments may use an arbitration policy which is fair in the sense that it provides at least some guaranteed opportunities for each type of request to be selected, even if it allows one type of request to be selected more frequently than others (e.g. a weighted round robin policy).

However, when arbitration is combined with hazard detection then even if the arbitration policy is fair, the subsequent hazard detection may still cause denial of service to a particular type of request, for the reasons given above. By setting the hazard indication as discussed above, this problem can be avoided because the hazard detection stage can reject arbitrated requests if they conflict with another request which previously won the arbitration but was returned to the arbitration stage because of a hazard, to ensure that the same request does not keep getting rejected at the hazard detection stage.

The particular hazard condition detected by the hazard detection stage may vary depending on the type of request or the way in which the request is serviced. However, in general each request may specify a target resource for servicing the request. For example the resource may be a target device which is to service the request, use of a resource such as a buffer or bus which provides a slot for accommodating the request, or data or a memory location to be accessed in response to the candidate request. If one request is already using a particular resource, then another request specifying the same target resource may not be able to be processed for at least may not be able to be processed correctly—e.g. with a request for access to data, if one device is writing to data from a given address then another request for reading from the same address will not give the correct result until the earlier write is complete).

Hence, the hazard detection stage may detect that the hazard condition is met if the arbitration request specifies the same target resource or group of target resources as the request being serviced. In the case where the resource is a data value or memory location to be accessed in response to the candidate request, requests may be considered to specify the same target resource if they specify the same memory address, or specify the same group of resources if they specify memory addresses within the same unit of memory, such as a cache line or a memory page for example.

Similarly, when detecting whether an arbitration request conflicts with a candidate request having the hazard indication set, the hazard detection stage may check whether the arbitrated request specifies the same target resource or group of resources as the request having the hazard indication set. An arbitrated request may be considered to conflict with a candidate request if the arbitrated request would be considered to meet the hazard condition if the candidate request had already been selected for servicing.

In one example, the device may have at least one request buffer which buffers both candidate requests received by the device for the first time, and candidate requests returned to the arbitration stage from the hazard detection stage if a hazard has been detected. This means that requests rejected because of hazards can be buffered within the device for selecting requests, rather than being rejected back to the device which initiated them. This improves performance by eliminating the need for the initiator device to repeat the request, which could require a long round trip time.

Where the arbitration is between requests of different types, a request buffer may be provided for each type of request, and the arbitration stage may for example select between candidate requests taken from each buffer.

The hazard indication may be implemented in different ways. In general, the device may have some storage locations for storing the hazard indication, e.g. a set of registers. In some cases, it may be sufficient to store identifiers of any requests which have previously been hazarded and returned to the arbitration stage from the hazard detection stage.

However, in one example the request buffer may be used to maintain the hazard indicator. For each buffered candidate request, the request buffer may store an identifier of the candidate request together with a hazard indication identifying whether the candidate request was previously detected as meeting the hazard condition when it was selected as the arbitration request. For example, the identifier may be an indication of the resource which is to process the request (e.g. an identifier of the target device, or an address of data to be processed in response to the request). In some systems, there may only be allowed one request per resource at a time for a given request buffer, in which case an identifier of the target resource may be enough to uniquely identify a request. If multiple requests per resource are allowed, then the identifier may also include a portion that distinguishes different requests for the same resource.

As well as the hazard indication, the buffer may also identify a serviced indication which indicates whether the candidate request has been selected for being serviced. This is useful for detecting the hazard condition. Hence, the hazard detection stage may for example detect that the hazard condition is met for an arbitrated request if it targets the same resource as a request indicated in the request buffer with the serviced indication set. In some embodiments, the device may select a single request to be serviced in a given processing cycle, so that the requests are serialized. Other embodiments may allow multiple requests to be serviced simultaneously, so that the device may select several requests in parallel. In this case, the arbitration stage may select multiple requests as an arbitrated request in the some cycle, and the hazard detection stage may detect for hazards between the two or more arbitrated requests selected by the arbitration stage as well as hazards between an arbitrated request and a request already being serviced.

In one example, the hazard indication may be set for every arbitrated request which is returned from the hazard detection stage. Hence, even if another candidate request which would conflict with the arbitrated request already has an indication set, the hazard detection stage may still set the hazard indication when another arbitrated request hazards.

In other examples, the hazard indication may only be set the first time a request for a given resource is hazarded. For subsequent requests that would conflict with the first hazarding request, the hazard indication may not be set even if they are also hazarded. This approach can make it easier to ensure that the request which first encountered the hazard is serviced ahead of other conflicting requests.

In some example embodiments, the hazard indication may comprise a hazard flag which has a first state indicating that a corresponding candidate request was previously detected as meeting the hazard condition when selected as the arbitrated request and a second state for indicating that the candidate request has not previously been hazarded and returned from the hazard detection stage. In this case, a single bit may be enough to represent the hazard indication.

In other examples, the hazard indication may be a hazard ordering value which represents an order in which the request is to be serviced compared to other hazarded requests. Hence, as well as distinguishing requests returned in response to a hazard from requests which have not previously been returned, the hazard indication can also represent the order in which the requests were hazarded. For example, this can allow the device to ensure that once the hazard is resolved, the previously hazarded requests are serviced in the original order in which they were selected by the arbiter.

Also, in some cases the arbitration may be based on a priority level associated with each candidate request. Hence, the arbitration stage can for example favour selection of candidate requests with a higher priority level compared to requests with a lower priority level. For example, the priority value for a request may be set by the initiator device which issued the request. The priority level may also be referred to as a quality of service level (e.g. instead of having quantified priority levels represented using numeric values, it may be possible to define two or more classes of quality of service for requests, which are prioritised according to the quality of service class).

If priority levels are used, then the use of the hazard indication may also be based on priority level. For example, the hazard indication may be used to select between requests at the same level of priority, but a higher priority request may still be serviced ahead of a lower priority request with the hazard indication set. Hence, if an arbitrated request at the hazard detection stage does not have a hazard indication set, the hazard detection stage may return the arbitrated request to the arbitration stage if it conflicts with another candidate request with the hazard indication set which has the same priority level or greater, while a lower priority request with the hazard indication set may not cause the arbitrated request to be returned to the arbitration stage.

Similarly, the setting of the hazard indication may also be dependent on the priority level of the arbitrated request. If the hazard detection stage detects that the arbitrated request selected by the arbitration stage meets the hazard condition and so is being returned to the arbitration stage, then the hazard detection stage may set the hazard indication for the returned request only if no other candidate request having the hazard indication set would conflict with the arbitrated request and has the same priority level or greater as the arbitrated request. Hence, higher priority level requests would take precedence over hazarded requests of a lower priority, to ensure that the priority scheme is observed.

Where priority levels are used, the hazard indication may in some cases be the priority level itself, so that, for example, setting the hazard indication corresponds to raising the priority level of the request to a higher priority level.

The device for selecting requests may be implemented at various parts of the integrated circuit. For example, the device may be included in an interconnect, or a memory controller, or any other part of circuit for receiving requests and selecting between them to select requests for servicing by a target device such as a processor, memory or peripheral or a component within a target device such as a buffer or bus. The device could also be provided in a control unit coupled to a coherent cluster of processors for maintaining coherency between the processors.

In another example aspect, an interconnect is provided for connecting devices in an integrated circuit, with the interconnect including the device for selecting requests as discussed above.

In another example aspect, a data processing apparatus includes the device.

In another example aspect, a device for selecting requests to be serviced in a data processing apparatus comprises:

arbitration means for performing arbitration to select an arbitrated request from among a plurality of candidate requests received by the device; and hazard detection means for performing hazard detection to detect whether the arbitrated request selected by the arbitration means meets a hazard condition;

wherein if the hazard detection means detects that the arbitrated request selected by the arbitration means meets the hazard condition, then the hazard detection means is configured to control the arbitrated request to be returned to the arbitration means as a candidate request for a later arbitration and to set a hazard indication for the returned candidate request; and the hazard detection means is configured to control at least one other arbitrated request to be returned to the arbitration means as a candidate request for a later arbitration if it conflicts with a candidate request having the hazard indication set.

Viewed from another example aspect, a method is provided comprising:

performing arbitration to select an arbitrated request from among a plurality of received candidate requests;

performing hazard detection to detect whether the arbitrated request selected by the arbitration meets a hazard condition;

if the arbitrated request meets the hazard condition, controlling the arbitrated request to be returned as a candidate request for a later arbitration, and setting a hazard indication for the returned candidate request; and if at least one other arbitrated request conflicts with a candidate request having the hazard indication set, controlling the at least one other arbitrated request to be returned as a candidate request for a later arbitration.

The above, and other objects, features and advantages will be apparent from the following detailed description of illustrative embodiments which is to be read in connection with the accompanying drawings.

DESCRIPTION OF EXAMPLES

Figure 1:
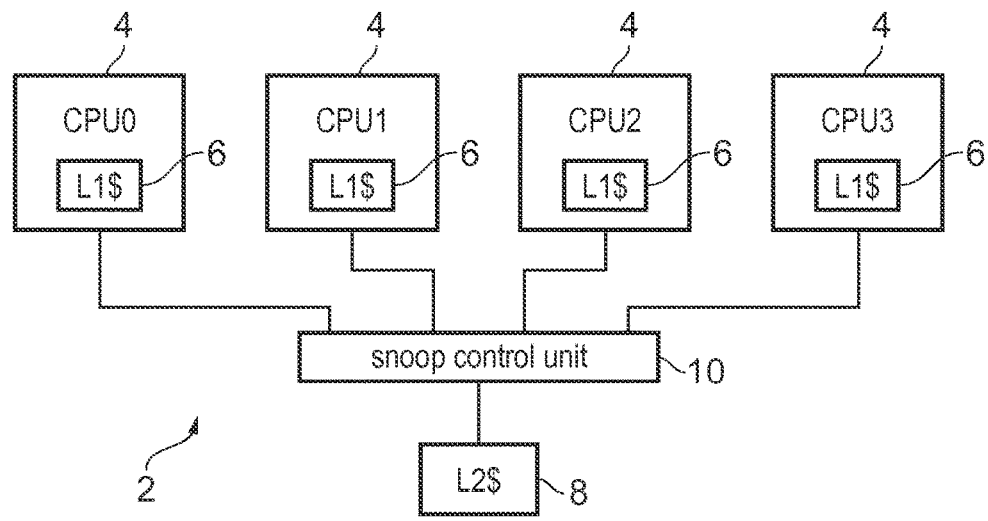
FIG. 1 illustrates a first example of a data processing apparatus comprising a device for selecting requests.

FIG. 1 schematically illustrates an example of a data processing apparatus 2 including several processors 4 each having a level 1 (L1) cache 6. The processors 4 share a level 2 (L2) cache 8. A snoop control unit 10 is coupled to the processors 4 and the L2 cache 8 and maintains coherency between the processors 4. For example, when one processor 4 issues a read or write transaction to a given address, the snoop control unit 10 may issue snoop transactions to check whether the L1 cache 6 of other processors 4 also holds a cached version of the data from the same address. If there are multiple versions of data from the same address, the snoop control unit 10 can identify which value is the latest one and ensure that it is written back to the L2 cache so that it is available to other processors 4. Sometimes, more requests targeting the L2 cache may be received than can be handled in the same cycle. For example, the L2 cache may only be able to handle one request at a time, but sometimes multiple processors may have issued requests. Therefore, the snoop control unit 10 may function as a device for selecting request to be serviced. Also, the snoop control unit 10 may check for hazards (e.g. read-after-write or write-after-write hazards) between requests for the same address, and prevent one request being serviced until another request with which the first request hazards has completed, to ensure data coherency.

Figure 2:
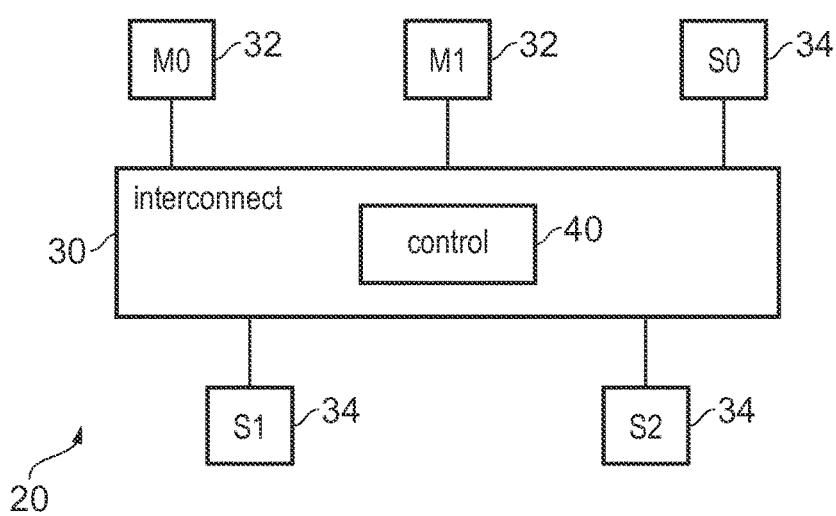
FIG. 2 shows another example of data processing apparatus comprising an interconnect having control logic for selecting requests.

FIG. 2 shows another example of a data processing apparatus 20 having an interconnect 30 and a number of master devices 32 and slave devices 34 connected to the interconnect. Master devices 32 may issue requests on the interconnect 30 to be serviced by slave devices 34. For example, the master devices may include one or more processors, GPUs, or other devices which can initiate transactions, and the slave devices 34 may include one or more memory controllers, peripherals and other devices which can service transactions. Some devices may be able to act as both a master and a slave. If multiple masters issue requests targeting the same slave, then control circuitry 40 within the interconnect 30 may arbitrate between the requests. Also, the control circuitry 40 may check for hazards to ensure data coherency. Hence, the control circuitry 40 may serve as a device for selecting requests.

These are just two examples of a data processing apparatus having a device for selecting requests which performs arbitration and hazard detection. More generally, the present technique can be applied to any device for selecting requests for a data processing apparatus or integrated circuit, which may be implemented as a separate device from other parts of a data processing apparatus or integrated circuit.

Figure 3:
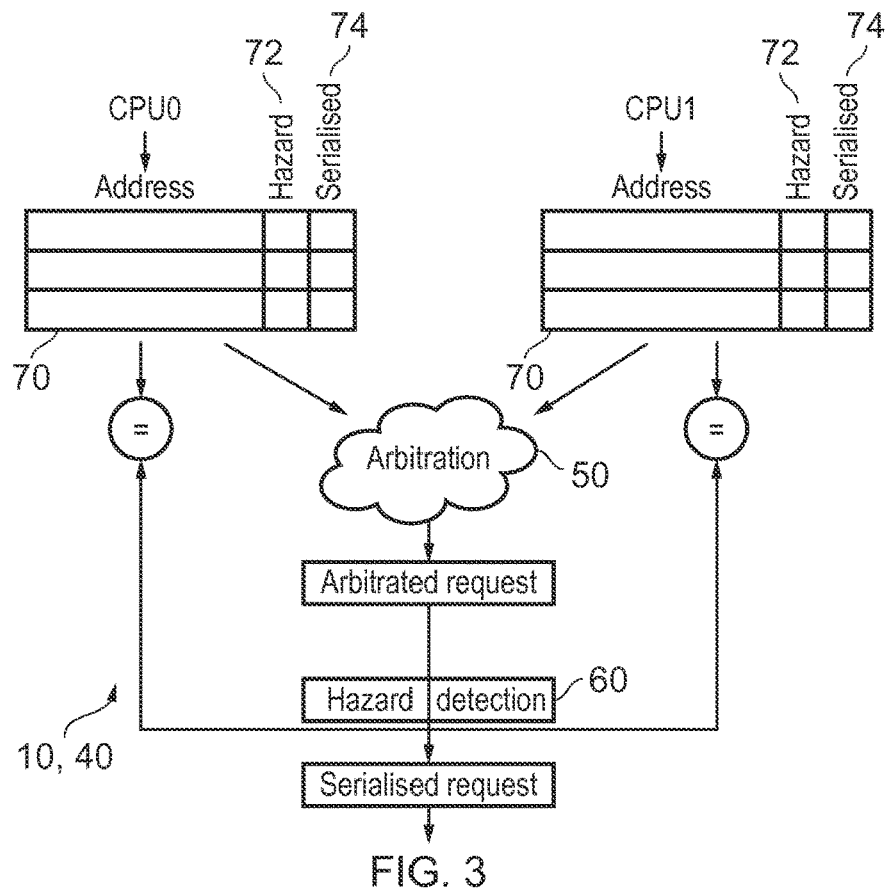
FIG. 3 shows an example of a device for selecting requests.

FIG. 3 shows an example of a device 10 for selecting requests. In this example, the device 10 has an arbitration stage 50 for arbitrating between requests from multiple processors CPU0, CPU1, and a hazard detection stage 60 for performing hazard checking to ensure that two requests cannot access the same cache line at the same time. If a request hazards, it is retried again later when the earlier request has completed. If a processor makes another request to the same address then the arbiter should not systematically prioritize that processor over the processor that had its request hazarded, as this could lead to unfairness, starvation, or denial of service.

Requests arrive from each CPU and are placed in one of several request buffers 70 that hold details of a request including an identifier of the request (in this example, its target address) and a number of status flags. The status flags in this example include a hazard flag 72, which represents whether the request has previously been returned to the arbitration stage 50 from the hazard detection stage 60 when a hazard was detected, and a serialized flag 74, which represents whether the request is being serviced. The hazard flag 72 is used to prevent denial of service to a request that was hazarded. The serialized flag 74 is used for the hazard check to detect the addresses of requests currently being serviced.

Candidate requests from the request buffers 70 of both CPUs are presented to the arbitration stage 50, which selects one which becomes an "arbitrated request". The hazard detection stage 60 then performs a hazard check for the arbitrated request against the requests in other request buffers 70, to check whether there is a request with the serviced flag 74 set that targets the same cache line. If the hazard check passes, then the arbitrated request becomes a "serialized request", and the serialized flag 74 is set for that request in the corresponding request buffer 70. Once serialized, the request can then proceed and perform whatever action it needs to do (e.g. to fetch data or update cache state). On the other hand, if the hazard detection stage 60 detects that the arbitrated request matches the address of another request that already has its serialized flag set, then the arbitrated request cannot be serialized, and so the arbitrated request is flushed from the pipeline, and must re-arbitrate later.

The arbiter 50 can be made to be fair between requests presented for arbitration at the same time, using known techniques such as round-robin or pseudo random arbitration. However the arbitration and hazard checking usually cannot be done in a single cycle, and so are pipelined over several cycles, which leads to the problem that a new request can be arbitrated and succeed while an older request that hazarded may not be presented to the arbiter at the same time and so the arbiter's fairness cannot apply and the newer request can be arbitrated unfairly.

This problem can be addressed by using the hazard flag 72. The hazard flag 72 is set for an arbitrated request (which won the arbitration at the arbitration stage 50), but which cannot be serialized because of a hazard. Also, at the hazard detection stage 60, if an arbitrated request does not have it its own hazard flag set, and does not hazard on another serialized request, but does conflict with (match the address of) a non-serialized request that has its hazard flag set, then the arbitrated request will be treated as hazarding and will be flushed and return for later arbitration. Therefore, the only requests to a previously hazarded address that can be arbitrated are those that have already been flushed and so can re-arbitrate at the same time and allow the fairness of the arbiter to apply. There are two options here: allow multiple requests to the same address to have their hazard flag set, with the requests being re-presented to the arbiter at the same time once the hazard has gone away, or only the first request to that address gets its hazard flag set and all the others do not have the hazard flag set. This latter option guarantees that the first request to be flushed is the one that will eventually be successful first, and then relies on fairness in the arbiter to pick the next request after that.

Figure 4:
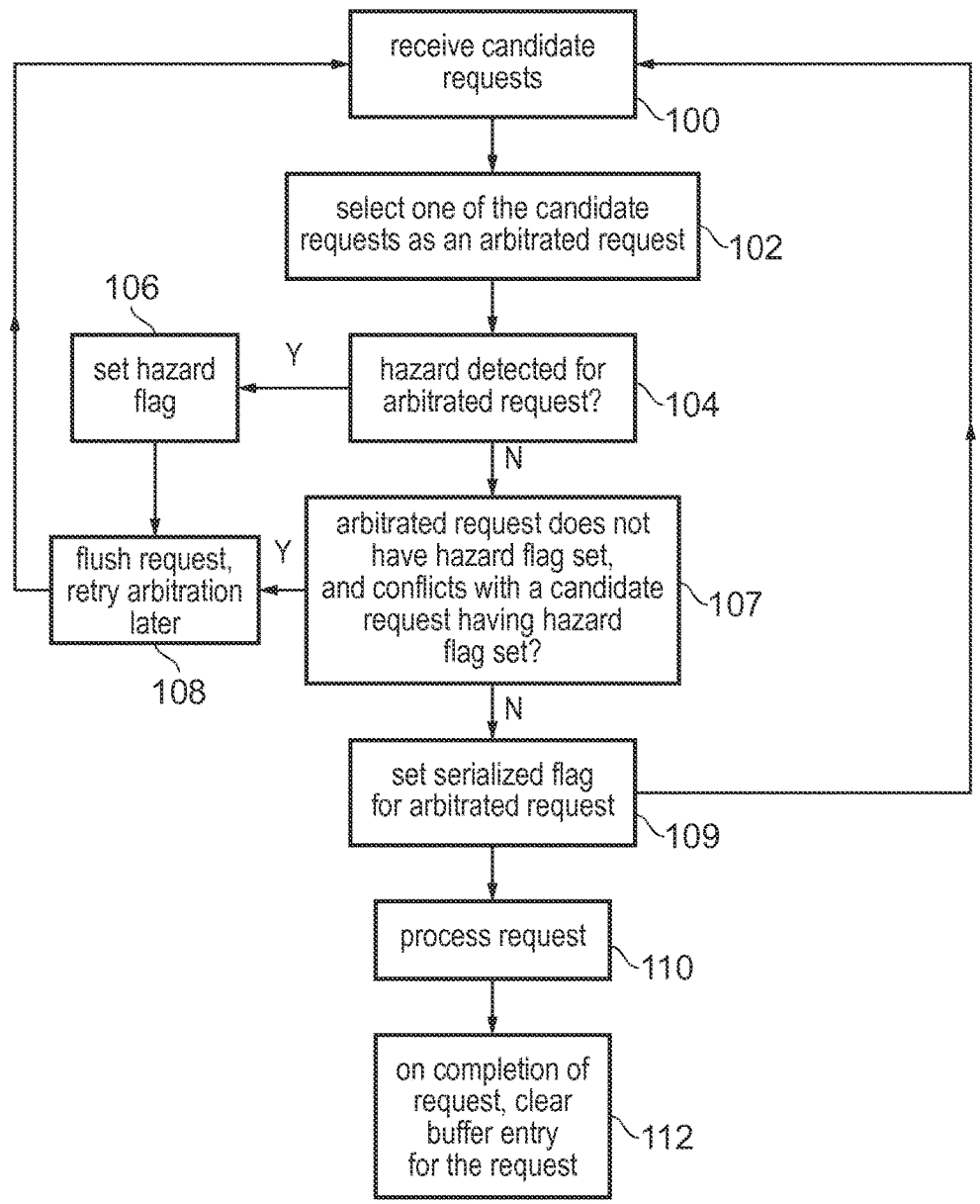
FIG. 4 is a flow diagram showing a first method of selecting requests.

FIG. 4 is a flow diagram showing an example of operation of the device shown in FIG. 3. At step 100 candidate requests are received and these are placed in the respective request buffers 70. At step 102, the arbitration stage 50 selects one of the candidate requests as an arbitrated request. The arbitration stage 50 may use an arbitration policy such as a round robin, weighted round robin or pseudo random. For example, for a fair arbitration the arbitration stage 50 may alternate between each request buffer 70.

At step 104 the hazard detection stage 60 detects whether a hazard has been detected. A hazard may be detected if the address of the arbitrated request matches the address of a request with the serialized flag set 74 in the request buffer 70. If a hazard is detected, than at step 106 the hazard detection stage 60 sets the hazard flag for the arbitrated request. At step 108, the request is flushed from the pipeline and the request returns to retry arbitration at the arbitration stage 50 in a later cycle. Hence, by setting the hazard flags the request is marked to show that it previously won the arbitration at the arbitration stage 50 but was rejected because of a hazard.

If no hazard is detected then at step 107 the hazard detection stage detects whether the arbitrated request does not have its hazard flag set and conflicts with a candidate request having the hazard flag set. If so, then again the method proceeds to step 108 where the request is flushed and returned to retry arbitration later at the arbitration stage 50. Hence, even if there is no actual hazard, if the arbitrated request matches the address of a candidate request which previously hazarded as indicated by its set hazard flag, then the arbitrated request is treated as hazarding. By preventing the current arbitrated request being serviced at this time (which might cause a hazard for the request with the hazard flag set by the time the request with the hazard flag set is selected as the arbitrated request), the request with the hazard flag set will be the first request to be processed for that address, to prevent a hazarded request continually being rejected as other conflicting requests get ahead of it in the queue. Essentially, once selected by the arbitration stage 50, an arbitrated request then retains its slot for servicing even if a hazard occurs, and other requests to the same address cannot then take that slot, even if it takes some time for the hazard to go away and even if the hazarded arbitrated request is not presented for arbitration at the same time as the other requests to the same address (it may take some time for the hazarded request to return to be a candidate for arbitration).

If step 107 does not identify a conflicting request, then at step 109 the arbitrated request is selected for servicing and the serialized flag 74 is set in the buffer 70. The request is then processed at step 110. Meanwhile the method returns to step 100 where arbitration continues to select another arbitrated request. Eventually, the serviced request completes and then at step 112 the buffer entry for that request is cleared from the request buffer 70.

Hence, this approach enables the device 10, 40 to ensure that requests are not continually starved of service because of hazards.

While step 106 of FIG. 4 shows setting the hazard flag for any request for which a hazard is detected, other examples may only set the hazard flag for the first request to a particular address which is hazarded. Hence, some examples may have an additional step of checking whether there are any other requests with the hazard flag set which specify the same address, and then step 106 may only be performed if there are no such requests. In this case, it is not necessary to check whether the arbitrated request has the hazard flag set at step 107, since only one request for a given address can have the hazard flag set, and so if there is another candidate request with the hazard flag set, by definition the current arbitrated request will not have the hazard flag set. Hence, step 107 could simply check whether the arbitrated request conflicts with another request having the hazard flag set, and if so, the method would proceed to step 108.

While FIG. 3 shows an example in which the arbitrator 50 arbitrates between requests from different processors, more generally this technique can be applied to any technique for performing arbitration between multiple requests, in which the winning request selected in the arbitration is then subject to hazard detection. For example, the arbitration could be between different types of requests, or simply between requests of a single type or requests in a single buffer.

Also, while FIG. 3 shows an example where requests are serialized if they pass the hazard check, other systems may be able to process several requests in parallel, so it is not essential for requests to be serialized. More generally, requests may be serviced when they pass the hazard check.

Also, while FIG. 3 shows an example where the requests are data access requests to a given memory address, more generally the technique may be applied to any system which selects between requests which target a given target resource. The resource may for example be a specified device which should service the request or a unit within a device which can process a limited number of requests at a time (such as a buffer or bus). Also, with data access requests targeting a particular memory location or data value, the requests could specify addresses of individual memory locations, or larger blocks of memory such as a cache line, memory page, or other unit of memory locations. Hence, in general the requests may each specify a target resource, and the hazard detection stage 60 may detect a hazard if an arbitrated request targets the same resource or the same group of resources as a request being serviced. Similarly, at step 107 of FIG. 4 requests may be considered to conflict if they target the same resource or the same group of resources.

FIG. 3 shows an example with a separate arbitration stage 50 and hazard detection stage 60. However, it will be appreciated that in some implementations, a single processing unit may act as both the arbitration stage 50 and the hazard detection stage 60. Hence, in hardware, it is possible to provide a single combined arbitration/hazard detection circuit, or separate arbitration and hazard detection circuits, as desired.

Figure 6:
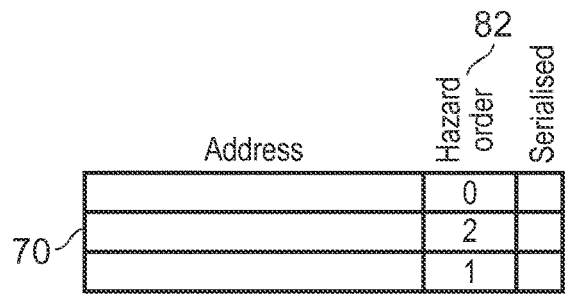
FIG. 6 shows an example of a hazard indication represented using an ordering value.

The example of FIG. 3 uses a hazard flag 72 which comprises a bit which has a first value (e.g. 1) indicating that the request has previously been hazarded and returned from the hazard detection stage 60, and a second value (e.g. 0) which indicates that the request has not previously been hazarded. However, as shown in FIG. 6 it is also possible to use a hazard ordering parameter 82 which indicates the order in which hazarded requests were encountered. For example, requests which have not been hazarded may have a predetermined ordering value (e.g. 0), and requests which have been hazarded may have other values (e.g. 1, 2 . . . ), with the particular value indicating the order in which the hazarded requests were encountered. For example, a hazard count may be maintained for each address for which a hazard has been detected, and incremented each time a hazard is detected. The hazard ordering parameter 82 for a request for which a hazard has been detected may be set to the current value of the ordering parameter. The hazard count can then be set back to the predetermined value when the hazarded requests to a particular address have been serviced. At step 107 of FIG. 4, the arbitrated request may also be rejected if it has a hazard ordering value other than the predetermined ordering value, but conflicts with another request having a hazard ordering value indicating that the other request was hazarded earlier than the current request. By tracking the order in which requests were hazarded as well as the more fact that they were hazarded, the order can be respected so that earlier encountered requests are serviced ahead of later encountered requests, to improve performance.

Hence, more generally any hazard indication may be used which indicates whether a request was previously hazarded when selected as the arbitrated request. There may be various forms of the hazard indication. Another example may be a data store which records addresses of requests which have been hazarded, separate from the request buffer 70.

Figure 5:
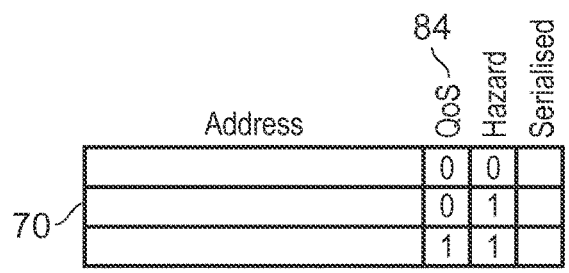
FIG. 5 shows an example of prioritising requests according to a quality of service level.

FIG. 5 shows another example in which a priority level (quality of service level) 84 is set for each request. An initiator device which initiated a request may set the priority level 84 to indicate the relative importance of the request, and then the arbitration stage 50 may prioritise requests with a higher priority level compared to requests with lower priority levels. For example, a weighted round robin scheme may be used to give higher priority requests more opportunities to be selected than lower priority requests. Even if requests are prioritised, lower priority requests may still be given some opportunity to be selected (this prevents starvation of lower priority requests). The priority level may be represented in different ways. In some examples, higher priority levels may be indicated by higher numeric values of the priority value (e.g. priority level 1 is more important than priority level 0), while in other examples it may be the other way round (e.g. priority level 0 may be more important than priority level 1). In other cases, a non-numeric representation of priority may used. E.g. requests may have an associated request type identifier and requests of a particular type may be prioritised compared to requests of another type. Similarly, some systems may treat requests from one initiator device as having a higher priority than requests from another initiator device, so an identifier of the initiator device may be treated as a priority indication.

Figure 7:
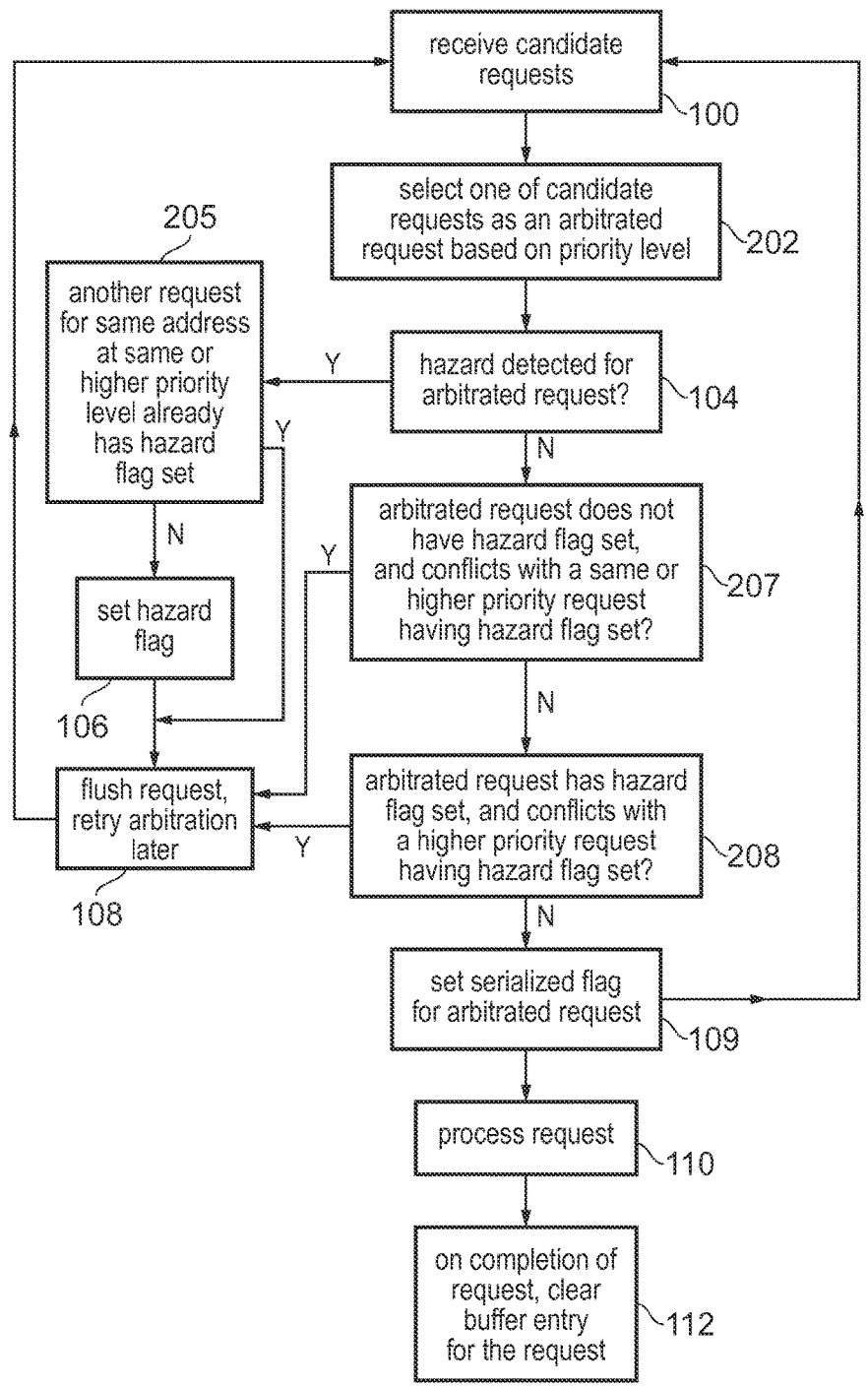
FIG. 7 shows a flow diagram illustrating a method of selecting requests based on a priority level and a hazard indication.

When requests are prioritised, then the hazard indication 72 may also be used on a priority level basis. This can be useful to ensure that a lower priority request with the hazard indication set does not prevent servicing of a higher priority request with the hazard indication not set. FIG. 7 shows a flow diagram showing an example of using the hazard indication in a system using priority (QoS) levels. The steps that are the same as in FIG. 4 are shown with the same reference numbers and so are not described again here.

In FIG. 7, step 202 replaces step 102 of FIG. 4. In step 202 the arbitrated request is selected based on the priority level. The hazard detection at step 104 is the same as in FIG. 4. However, in FIG. 7 if a hazard is detected then the method proceeds to step 205 where it is detected whether there is another request for the same address which has the same or higher quality of service level as the arbitrated request and which has the hazard flag set. If so then step 106 of setting the hazard flag is omitted, and the method proceeds straight to step 108 where the request is flushed and retried for arbitration later. The hazard flag is set at step 106 if there is no same- or higher-priority request with the hazard flag set. This prevents a hazarded lower priority request pre-empting a higher priority request, and also ensures that only the first request at a given priority level has the hazard flag set.

Also, step 107 of FIG. 4 is replaced with steps 207 and 208 in FIG. 7. At step 207 it is detected whether an arbitrated request that does not have its hazard flag set conflicts with a candidate request with the same or higher priority level that has the hazard flag set. If so then the method proceeds to step 108 where the arbitrated request is flushed. At step 208, it is detected whether the hazard flag is set for the arbitrated request, but there is a higher priority request with the hazard flag set, and if so, then again at step 108 the arbitrated request is flushed and retries arbitration later. If neither steps 207 and 208 detect a conflicting request, then at step 109 the arbitrated request is serialized and then processed in steps 110 and 112 in the same way as in FIG. 4.

Hence, this mechanism ensures that the priority of requests is respected. Even if the hazard flag is set for a request, it will not be serviced if a higher priority request for the same address (resource) also has the hazard flag set, to save the "slot" for servicing for the higher priority request.

Although illustrative embodiments have been described in detail herein with reference to the accompanying drawings, it is to be understood that the invention is not limited to those precise embodiments, and that various changes and modifications can be effected therein by one skied in the art without departing from the scope of the appended claims.

The invention claimed is:

1. A device for selecting requests to be serviced in a data processing apparatus, the device comprising:
   arbitration circuitry configured to perform arbitration to select an arbitrated request from among a plurality of candidate requests received by the device; and
   hazard detection circuitry configured to perform hazard detection to detect whether the arbitrated request selected by the arbitration circuitry meets a hazard condition;

wherein if the hazard detection circuitry detects that the arbitrated request selected by the arbitration circuitry meets the hazard condition, then the hazard detection circuitry is configured to control the arbitrated request to be returned to the arbitration circuitry as a candidate request for a later arbitration and to set a hazard indication for the returned candidate request; and the hazard detection circuitry is configured to control at least one other arbitrated request to be returned to the arbitration circuitry as a candidate request for a later arbitration if it conflicts with a candidate request having the hazard indication set.

2. The device according to claim 1, wherein said at least one other arbitrated request comprises an arbitrated request for which the hazard indication is in a state other than the state in which the hazard indication is set.

3. The device according to claim 1, wherein in each arbitration, the arbitration circuitry is configured to select at least two candidate requests from the plurality of candidate requests received by the device, and to select the arbitrated request from said at least two candidate requests; and the hazard detection circuitry is configured to detect that the at least one other arbitrated request conflicts with a candidate request having the hazard indication set even if the candidate request having the hazard indication set is not currently one of said at least two candidate requests selected for arbitration by the arbitration circuitry.

4. The device according to claim 1, wherein the candidate requests comprise a plurality of types of candidate requests, and the arbitration is for selecting which type of candidate request is serviced by the target device.

5. The device according to claim 4, wherein the plurality of types of candidate requests comprise candidate requests received from a plurality of different initiator devices.

6. The device according to claim 1, wherein each candidate request specifies a target resource for servicing the request.

7. The device according to claim 6, wherein the target resource comprises at least one of a target device which is to service the request, a memory location to be accessed in response to the candidate request, data to be accessed in response to the candidate request, and a resource required for servicing the request.

8. The device according to claim 6, wherein the hazard detection circuitry is configured to detect that the arbitrated request meets the hazard condition if the arbitrated request specifies the same target resource or group of target resources as a request being serviced.

9. The device according to claim 6, wherein the hazard detection circuitry is configured to detect that the at least one other arbitrated request conflicts with the candidate request having the hazard indication set if the arbitrated request specifies the same target resource or group of target resources as the candidate request having the hazard indication set.

10. The device according to claim 1, comprising at least one request buffer configured to buffer the candidate requests received by the device and the candidate request returned to the arbitration circuitry.

11. The device according to claim 10, wherein for each candidate request, the at least one request buffer is configured to identify:

an identifier of the candidate request; and the hazard indication identifying whether the candidate request was previously detected as meeting the hazard condition when selected as the arbitrated request.

12. The device according to claim 11, wherein for each candidate request, the at least one request buffer is also configured to identify a serviced indication indicating whether the candidate request has been selected for being serviced.

13. The device according to claim 1, wherein if the hazard detection circuitry detects that the arbitrated request selected by the arbitration circuitry meets the hazard condition, then the hazard detection circuitry is configured to set the hazard indication for the returned candidate request even if another candidate request which would conflict with the arbitrated request already has the hazard indication set.

14. The device according to claim 1, wherein if the hazard detection circuitry detects that the arbitrated request selected by the arbitration circuitry meets the hazard condition, then the hazard detection circuitry is configured to set the hazard indication for the returned candidate request if no other candidate request which would conflict with the arbitrated request already has the hazard indication set.

15. The device according to claim 1, wherein the hazard indication comprises a hazard flag having a first state for indicating that a corresponding candidate request was previously detected as meeting the hazard condition when selected as the arbitrated request, and a second state for indicating that the corresponding candidate request was not previously detected as meeting the hazard condition when selected as the arbitrated request.

16. The device according to claim 1, wherein the hazard indication comprises a hazard ordering value;

wherein if the hazard detection circuitry detects that the arbitrated request selected by the arbitration circuitry meets the hazard condition, then the hazard detection circuitry is configured to set the hazard ordering value to indicate an ordering of the returned candidate request is to be serviced relative to other returned candidate requests; and if the hazard detection circuitry detects that the arbitrated request selected by the arbitration circuitry has the hazard indication set and the arbitrated request conflicts with another candidate request which the hazard ordering value indicates is ahead of the arbitrated request in said ordering, then the hazard detection circuitry is configured to control the arbitrated request to be returned to the arbitration circuitry as a candidate request for a later arbitration.

17. The device according to claim 1, wherein the arbitration circuitry is configured to perform the arbitration based on a priority level associated with each candidate request.

18. The device according to claim 17, if the hazard detection circuitry detects that the arbitrated request selected by the arbitration circuitry does not have the hazard indication set, then the hazard detection circuitry is configured to control the arbitrated request to be returned to the arbitration circuitry as a candidate request for a later arbitration if the arbitrated request conflicts with another candidate request having the same priority level as, or a greater priority level than, the arbitrated request for which the hazard indication is set.

19. The device according to claim 17, wherein if the hazard detection circuitry detects that the arbitrated request selected by the arbitration circuitry meets the hazard condition, then the hazard detection circuitry is configured to set the hazard indication for the returned candidate request if no other candidate request which would conflict with the arbitrated request and has the same priority level as, or a greater priority level than, the arbitrated request already has the hazard indication set.

20. An interconnect for connecting devices in an integrated circuit, the interconnect comprising the device according to claim 1.

21. A data processing apparatus comprising the device according to claim 1.

22. A device for selecting requests to be serviced in a data processing apparatus, the device comprising:
- means for performing arbitration to select an arbitrated request from among a plurality of candidate requests received by the device; and
- means for performing hazard detection to detect whether the arbitrated request selected by the means for performing arbitration meets a hazard condition;
- wherein if the means for performing hazard detection detects that the arbitrated request selected by the means for performing arbitration meets the hazard condition, then the means for performing hazard detection is configured to control the arbitrated request to be returned to the means for performing arbitration as a candidate request for a later arbitration and to set a hazard indication for the returned candidate request; and
- the means for performing hazard detection is configured to control at least one other arbitrated request to be returned to the means for performing arbitration as a candidate request for a later arbitration if it conflicts with a candidate request having the hazard indication set.

23. A method of selecting requests to be serviced in a data processing apparatus, the method comprising:
- performing arbitration to select an arbitrated request from among a plurality of received candidate requests;
- performing hazard detection to detect whether the arbitrated request selected by the arbitration meets a hazard condition;
- if the arbitrated request meets the hazard condition, controlling the arbitrated request to be returned as a candidate request for a later arbitration, and setting a hazard indication for the returned candidate request; and
- if at least one other arbitrated request conflicts with a candidate request having the hazard indication set, controlling the at least one other arbitrated request to be returned as a candidate request for a later arbitration.

* * * * *